(12) United States Patent
Tsukasaki

(10) Patent No.: US 11,084,520 B2
(45) Date of Patent: Aug. 10, 2021

(54) STEERING APPARATUS

(71) Applicant: SUBARU CORPORATION, Tokyo (JP)

(72) Inventor: Yuichiro Tsukasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 505 days.

(21) Appl. No.: 16/036,427

(22) Filed: Jul. 16, 2018

(65) Prior Publication Data

US 2019/0100232 A1 Apr. 4, 2019

(30) Foreign Application Priority Data

Sep. 29, 2017 (JP) .............................. JP2017-190792

(51) Int. Cl.
*B62D 5/00* (2006.01)
*B62D 15/02* (2006.01)
*B62D 6/00* (2006.01)

(52) U.S. Cl.
CPC ............ *B62D 5/006* (2013.01); *B62D 5/005* (2013.01); *B62D 6/008* (2013.01); *B62D 15/0215* (2013.01)

(58) Field of Classification Search
CPC .................................................... B62D 5/006
See application file for complete search history.

(56) References Cited

U.S. PATENT DOCUMENTS

| 9,701,337 B2 * | 7/2017 | Chai ..................... G01M 17/06 |
| 2002/0108804 A1 * | 8/2002 | Park ....................... B62D 5/005 180/444 |
| 2003/0150666 A1 * | 8/2003 | Ogawa .................. B62D 5/008 180/443 |
| 2004/0238257 A1 * | 12/2004 | Takahashi ............. B62D 6/008 180/402 |

(Continued)

FOREIGN PATENT DOCUMENTS

| DE | 10159330 A1 * | 7/2002 | ............ B62D 5/005 |
| JP | 2004-314774 A | 11/2004 | |

(Continued)

OTHER PUBLICATIONS

Notification of reason(s) for refusal issued in corresponding Japanese Patent Application No. 2017-190792 dated Mar. 5, 2019.

*Primary Examiner* — Tony H Winner
*Assistant Examiner* — Conan D Duda
(74) *Attorney, Agent, or Firm* — Troutman Pepper Hamilton Sanders LLP

(57) ABSTRACT

A steering apparatus for use in a vehicle equipped with a steer-by-wire system includes a shaft, a first reaction force member, and a second reaction force member. The shaft is configured to be able to rotate with rotation of a steering wheel disposed in a vehicle compartment. The first reaction force member is configured to apply a first reaction force in a direction opposite to a direction of the rotation of the shaft. The second reaction force member is configured to be able to apply and stop applying a second reaction force to the (Continued)

shaft. The second reaction force is different from the first reaction force and applied in a direction opposite to the direction of the rotation of the shaft. The second reaction force member applies the second reaction force when there is a decrease in the first reaction force.

11 Claims, 5 Drawing Sheets

(56) References Cited

U.S. PATENT DOCUMENTS

| | | | | |
|---|---|---|---|---|
| 2007/0159126 A1* | 7/2007 | Kanekawa | ......... | B62D 15/0215 318/625 |
| 2008/0230300 A1* | 9/2008 | Hara | ...... | B62D 6/008 180/402 |
| 2010/0288576 A1* | 11/2010 | Yamanaka | ............ | B62D 5/001 180/443 |
| 2012/0089301 A1* | 4/2012 | Koizumi | ............... | B62D 6/007 701/42 |
| 2015/0144418 A1* | 5/2015 | Ohno | .................. | B62D 6/008 180/446 |
| 2015/0191200 A1* | 7/2015 | Tsubaki | ................ | B62D 6/002 701/42 |
| 2015/0375780 A1* | 12/2015 | Chai | ................... | B62D 15/021 701/41 |
| 2016/0001810 A1* | 1/2016 | Tsubaki | ................... | B62D 6/08 701/42 |
| 2016/0229446 A1* | 8/2016 | Tamaizumi | ......... | B62D 5/0463 |
| 2016/0258516 A1 | 9/2016 | Showa | | |
| 2016/0297468 A1* | 10/2016 | Izutani | ................... | B62D 5/001 |
| 2016/0355207 A1* | 12/2016 | Urushibata | .............. | G05G 5/05 |
| 2017/0021858 A1* | 1/2017 | Kodera | .................. | B62D 5/008 |
| 2017/0120949 A1* | 5/2017 | Sakamaki | ............. | B62D 5/005 |
| 2017/0225704 A1* | 8/2017 | Urushibata | ............ | B62D 5/005 |
| 2017/0247048 A1* | 8/2017 | Namikawa | ........... | B62D 5/0463 |
| 2017/0369095 A1* | 12/2017 | Kodera | ................. | B62D 5/0421 |
| 2018/0086341 A1* | 3/2018 | Taniguchi | ............. | B62D 6/002 |
| 2018/0154925 A1* | 6/2018 | Steinkogler | .......... | F16D 27/108 |
| 2019/0100232 A1* | 4/2019 | Tsukasaki | ............. | B62D 5/006 |
| 2019/0202492 A1* | 7/2019 | Niwa | .................... | B62D 5/006 |
| 2020/0047764 A1* | 2/2020 | Yamashita | ...... | B60W 30/18145 |
| 2020/0247462 A1* | 8/2020 | Akutsu | ................... | H02P 27/06 |
| 2020/0324808 A1* | 10/2020 | Kodera | ............... | B62D 5/0463 |
| 2020/0331522 A1* | 10/2020 | Yamashita | ........... | B62D 5/0484 |
| 2020/0361517 A1* | 11/2020 | Namikawa | .......... | B62D 15/027 |
| 2020/0361525 A1* | 11/2020 | Kodera | ................. | B62D 6/008 |

FOREIGN PATENT DOCUMENTS

JP  2008-285032 A  11/2008
JP  2016-159895 A  9/2016

* cited by examiner

STEERING APPARATUS

CROSS-REFERENCE TO RELATED APPLICATIONS

The present application claims priority from Japanese Patent Application No. 2017-190792 filed on Sep. 29, 2017, the entire contents of which are hereby incorporated by reference.

BACKGROUND

1. Technical Field

The present invention relates to a steering apparatus, more specifically to a steering apparatus capable of continuously giving a passenger an appropriate sense of steering, for use in a vehicle equipped with a steer-by-wire system.

2. Related Art

There has been known a reaction force actuator to apply a reaction force to the steering of a vehicle equipped with a steer-by-wire system including an operation side shaft that rotates with a steering wheel, and a motor having a motor output axis that transmits the reaction force to the operation side shaft, for example, disclosed in Japanese Unexamined Patent Application Publication No. 2016-159895.

SUMMARY OF THE INVENTION

An aspect of the present invention provides a steering apparatus for used in a vehicle equipped with a steer-by-wire system. The apparatus includes: a shaft rotatable with rotation of a steering wheel disposed in a vehicle compartment; a first reaction force member configured to apply a first reaction force in a direction opposite to a direction of the rotation of the shaft; and a second reaction force member capable of applying and stopping applying a second reaction force to the shaft. The second reaction force is different from the first reaction force and applied in a direction opposite to the direction of the rotation of the shaft. The second reaction force member applies the second reaction force when there is a decrease in the first reaction force.

DETAILED DESCRIPTION

Figure 1:
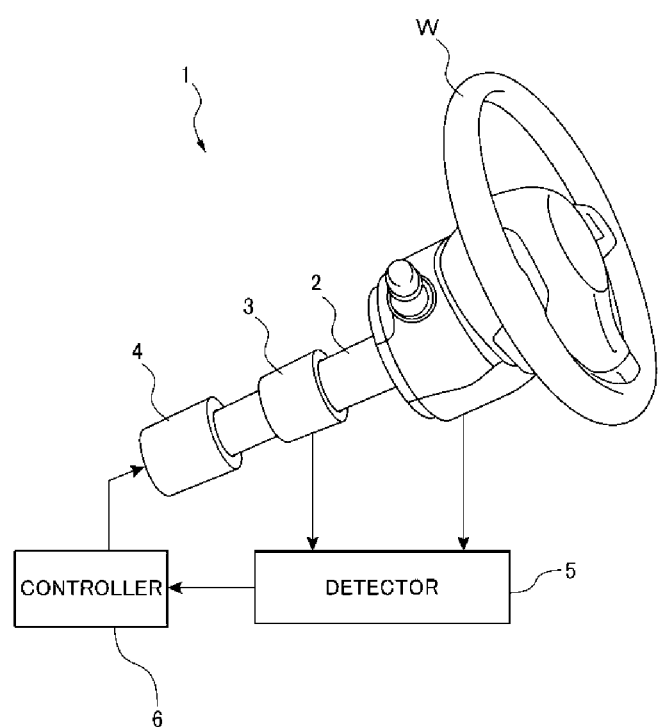
FIG. 1 is a perspective view illustrating an example of a steering apparatus according to the present invention.

When such an above-described reaction force applying mechanism using a motor is adopted, a problem with the development of a steering reaction force may occur, for example, the development is slow or too fast. To realize an appropriate development of the steering reaction force, another reaction force applying mechanism may be adopted. However, even though the appropriate development of the steering reaction force is realized, the steering reaction force may sometimes be decreased during the steering.

It is desirable to provide a steering apparatus capable of continuously giving a passenger an appropriate sense of steering, for use in a vehicle equipped with a steer-by-wire system.

The steering apparatus according to the present invention is applicable to a vehicle equipped with a steer-by-wire system that can electrically detect a steering angle and a steering angular velocity without a rack and pinion. Hereinafter, an example of the steering apparatus according to the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

FIG. 1 is a perspective view schematically illustrating part of a steering apparatus 1 according to an example of the present invention.

As illustrated in FIG. 1, the steering apparatus 1 includes a steering wheel W, a shaft 2, a first reaction force member 3, a second reaction force member 4, a detector 5, and a controller 6.

The steering wheel W is held by a passenger to steer a vehicle. The steering wheel W is basically a circular member disposed in a vehicle compartment. The steering wheel W can be rotated about an approximately circular central shaft.

The shaft 2 extends from the steering wheel W to the front of the vehicle, and can be rotated with the rotation of the steering wheel W. The shaft 2 is rotatably fixed to, for example, a component of the vehicle body. The axis of rotation of the steering wheel W is approximately the same as that of the shaft 2. For the vehicle equipped with the steer-by-wire system, there is no need to couple the steering wheel W to wheels by a mechanical structure such as a rack and pinion. Therefore, the length of the shaft 2 is not limited as long as a sensor can be attached to the shaft 2 to detect the steering angle and the steering angular velocity of the steering wheel W. The sensor attached to the shaft 2 may be located in front of or behind a first reaction force member 3 and a second reaction force member 4 described later in the front-to-back direction of the vehicle.

The first reaction force member 3 applies a first reaction force in the direction opposite to the direction of the rotation of the shaft 2 to the shaft 2. The first reaction force member 3 is fixed to a component of the vehicle body so as not to rotate. The first reaction force member 3 will be described in detail later, with reference to FIG. 2.

The second reaction force member 4 applies a second reaction force in the direction opposite to the direction of the rotation of the shaft 2, which is different from the first reaction force, to the shaft 2. Here, the second reaction force member 4 can apply and stop applying the second reaction force to the shaft 2, and can adjust the magnitude of the second reaction force. When there is a decrease in the first reaction force applied by the first reaction force member 3, the second reaction force member 4 applies the second reaction force to the shaft 2. The second reaction force member 4 can be electrically activated to generate the second reaction force and stopped. For example, a unit for applying a reaction force by using a motor which can produce a rotation in the direction opposite to the direction of the rotation of the shaft 2 may be adopted as the second reaction force member 4. As the second reaction force member 4 according to the present invention, various devices and members may be adopted as long as they can apply a steering reaction force to the steering of the vehicle equipped with the steer-by-wire system.

The detector 5 detects the rotation angle and the rotation angular velocity of the shaft 2, the steering reaction force (first reaction force and second reaction force) applied to the shaft 2, and the rate of change in each of the rotation angle, the rotation angular velocity, and the steering reaction force. An appropriate sensor may be adopted as the detector 5. Various information detected by the detector 5 can be outputted to the controller 6.

The controller 6 controls to activate the second reaction force member 4 based on the result of the detection by the detector 5. An appropriate arithmetic processing unit may be adopted as the controller 6. The controller 6 can set a threshold according to the result of the detection by the detector 5, and control to activate the second reaction force member 4 based on the threshold. The second reaction force member 4, the detector 5, and the controller 6 will be described in detail later, with reference to FIGS. 3 to 5.

Figure 2:
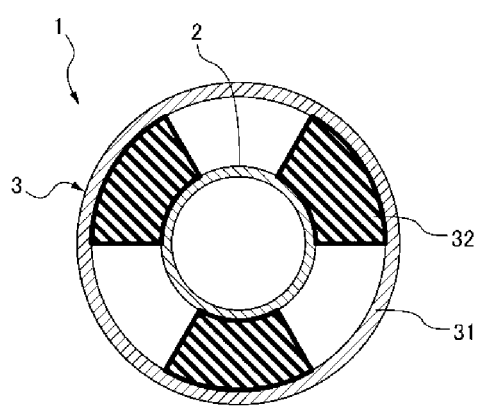
FIG. 2 is a cross-sectional view illustrating a shaft and a first reaction force member of the steering apparatus illustrated in FIG. 1, where the shaft and the first reaction force member are cut in a direction approximately orthogonal to the axis of the shaft.

Now, the first reaction force member 3 will be described with reference to FIG. 2. FIG. 2 is a cross-sectional view illustrating the shaft 2 and the first reaction force member 3 of the steering apparatus 1 illustrated in FIG. 1, where the shaft 2 and the first reaction force member 3 are cut in a direction approximately orthogonal to the axis of the shaft 2.

As illustrated in FIG. 2, the first reaction force member 3 includes an outer cylinder 31 and elastic members 32.

The outer cylinder 31 is a cylindrical body into which part of the shaft 2 is inserted. The outer cylinder 31 is fixed so as not to rotate. The shaft 2 is disposed in the outer cylinder 31 such that the axis of the shaft 2 is approximately the same as that of the outer cylinder 31. The elastic members 32 are elastic bodies provided around the shaft 2. The elastic members 32 are disposed between the outer surface of the shaft 2 and the inner surface of the outer cylinder 31, and fixed to the outer cylinder 31. Portions of the elastic members 32 facing the shaft 2 are pressed against the outer surface of the shaft 2, but are not fixed to the shaft 2.

As illustrated in FIG. 2, the shaft 2 has a circular cross-section. The three elastic members 32 are provided to support the outer surface of the shaft 2 from three directions. The portions of the elastic members 32 facing the outer surface of the shaft 2 are formed to fit the outer surface of the shaft 2.

Various materials can be selected for the shaft 2 and the outer cylinder 31, as long as the materials have a stiffness that prevents the shaft 2 and the outer cylinder 31 from being deformed even though the steering is performed many times. The materials may be, for example, metal, synthetic resin, and carbon fiber. In addition, various materials can be selected for the elastic members 32, as long as the materials has a Young's modulus or returnability which is enough to apply the first reaction force to the shaft 2 as a steering reaction force (described later). The materials of the elastic members 32 may be, for example, elastomer.

When the passenger steers the vehicle by rotating the steering wheel W, the shaft 2 is rotated at the same degree in the same direction of those of the steering wheel W. The shaft 2 is rotated with the rotation of the steering wheel W, while the outer cylinder 31 and the elastic members 32 attached to the outer cylinder 31 are not rotated. When the shaft 2 is rotated, friction is created between the shaft 2 and the elastic members 32 pressed against the shaft 2. This friction causes the portions of the elastic members 32 pressed against the shaft 2 to be elastically deformed. The elastic members 32 contact the shaft 2 being rotated, so that the first reaction force is applied to the shaft 2 by the first reaction force member 3. That is, when rotating the steering wheel W, the passenger senses a force required to deform the elastic members 32 via the shaft 2 as the steering reaction force (first reaction force).

Here, by adopting the first reaction force member 3 with the elastic members 32 as the present example, the development of the first reaction force can be similar to the development of the steering reaction force of an existing vehicle with a rack and pinion. That is, when steering the vehicle, the passenger is unlikely to have a feeling of strangeness, for example, feel that the development of the steering reaction force is slow or too fast.

However, in a case in which the vehicle is equipped with the steer-by-wire system, when a steering reaction force is developed not by an electrical mechanism but by a mechanical mechanism as the first reaction force member 3, the steering reaction force (first reaction force) may be decreased if the steering angle, that is, the rotation angle of the shaft 2 is equal to or greater than a predetermined angle. In this case, if the passenger continues to rotate the steering wheel W, the force required to rotate the steering wheel W is decreased at a certain point. Here, the passenger may sense that the steering effort becomes light and the rotation of the steering wheel W is lost in the steering direction. The sense that the steering effort becomes light and the rotation is lost in the steering direction may cause the passenger to have a feeling of strangeness about the steering.

In an existing vehicle which is not equipped with the steer-by-wire system, a series of steering components such as a steering wheel, a rack and pinion, a plurality of shaft members, and wheels are mechanically coupled to each other. With this conventional mechanical steering mechanism, when the passenger steers the vehicle, a resistance force against the steering is generated as the steering reaction force, and the steering reaction force is increased with the rotation of the steering wheel, and, when the steering angle is equal to or greater than a predetermined angle, the steering reaction force is stabilized or increased a little. When the steering reaction force is balanced with the steering effort of the passenger, the passenger can realize that the steering effort is directly proportional to the steering reaction force.

Figure 3:
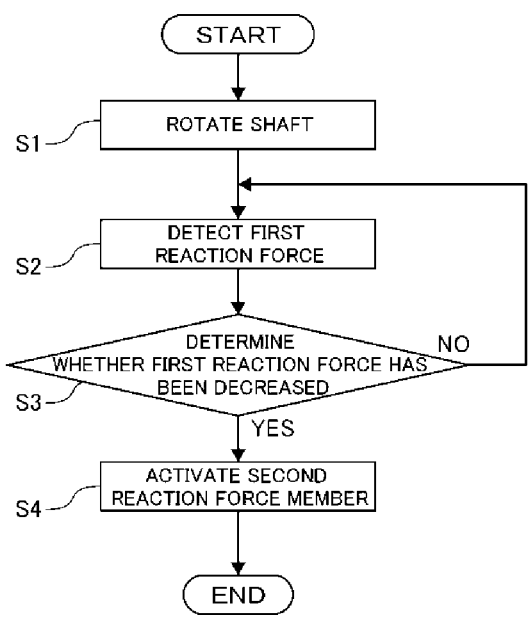
FIG. 3 is a flowchart illustrating a process of applying a steering reaction force to the shaft by using the steering apparatus illustrated in FIG. 1.

Therefore, even though the vehicle is equipped with the steer-by-wire system, the vehicle needs a steering apparatus capable of applying an appropriate steering reaction force similar to that of a vehicle equipped with a rack and pinion, that is, a steering reaction force that can be increased in directly proportion to an increase in the steering angle and that can last. In particular, if the steering reaction force is decreased during the steering, the passenger may sense that the steering effort is not directly proportional to the steering reaction force. To address this problem, the steering apparatus 1 according to the present example includes the second reaction force member 4, the detector 5, and the controller 6. Now, a basic process performed in the steering apparatus 1 using those components will be described with reference to FIG. 3. FIG. 3 is a flowchart illustrating a process of applying a steering reaction force to the shaft 2 by using the steering apparatus 1 illustrated in FIG. 1.

First, the passenger rotates the steering wheel W. The shaft 2 is rotated with the rotation of the steering wheel W (step S1). By this means, the shaft 2 being rotated elastically deforms the elastic members 32 in its rotating direction in the outer cylinder 31 as described above, and therefore the first reaction force as the steering reaction force is applied from the first reaction force member 3 to the shaft 2.

Next, the detector 5 detects the first reaction force being applied to the shaft 2 (step S2). The detector 5 outputs information on the magnitude of the detected first reaction force to the controller 6.

Next, the controller 6 determines whether the first reaction force detected by the detector 5 has been decreased (step S3). In the step S3, the first reaction force detected by the detector 5 is stored over time, for example, in the controller 6, and the controller 6 determines whether the first reaction force starts to decrease, or the temporal change rate of the first reaction force stops increasing and starts to decrease.

When determining that the first reaction force has not been decreased, that is, continue to increase or is constant (step S3/NO), the controller 6 performs the previous step S2 of detecting the first reaction force again.

On the other hand, when determining that there is a decrease in the first reaction force (step S3/YES), the controller 6 activates the second reaction force member 4 (step S4). In the step S4, the controller 6 outputs a driving signal to the motor of the second reaction force member 4, and therefore it is possible to apply the second reaction force to the shaft 2 from the motor rotating in the direction opposite to the rotating direction of the shaft 2. The process illustrated in FIG. 3 ends. Note that the magnitude of the steering reaction force to be applied to the shaft 2, that is, the magnitude of the second reaction force by the second reaction force member 4 varies depending on the variation characteristic of the first reaction force by the first reaction force member 3. The variation characteristic of the first reaction force may be, for example, the deformation characteristic of the elastic members 32, and be derived by previously measuring, accumulating and analyzing, as data, the magnitude of the force applied from the shaft 2 to the elastic members 32, the degree of elastic deformation of the elastic members 32, and the degree of decrease in the first reaction force. The second reaction force may be applied to the shaft 2 such that the second reaction force is gradually increased depending on the deformation characteristic of the elastic members 32, or continue to be applied at a constant magnitude.

With this process illustrated in FIG. 3, even though there is a decrease in the first reaction force, the second reaction force is applied to the shaft 2, and therefore the steering reaction force that the passenger senses, that is, the sum of the decreased first reaction force and the added second reaction force is not significantly decreased. By this means, the passenger does not sense or is unlikely to sense that the steering effort becomes light and the rotation is lost in the steering direction as described above, and consequently it is possible to continue to give the passenger an appropriate sense of steering not only when the steering reaction force is developed but also after the development.

Figure 4:
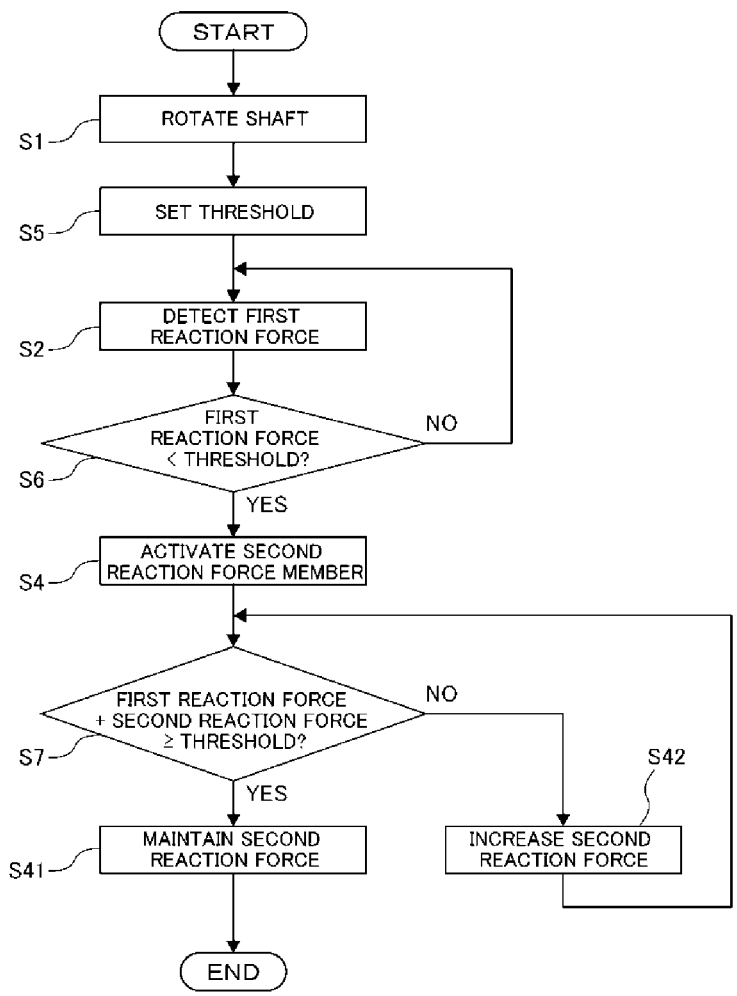
FIG. 4 is a flowchart illustrating a process of applying a steering reaction force to the shaft based on a threshold by using the steering apparatus illustrated in FIG. 1.

FIG. 4 is a flowchart illustrating a process of applying a steering reaction force to the shaft 2 based on a threshold by using the steering apparatus 1 illustrated in FIG. 1.

As illustrated in FIG. 4, the step S1 of rotating the shaft 2 with the steering by the passenger is the same as that in the process illustrated in FIG. 3. While the shaft 2 is being rotated, that is, the first reaction force member 3 applies the first reaction force to the shaft 2, a threshold (first threshold) is set (step S5). This threshold is set based on at least one of the correlation between the magnitude of the first reaction force and the rotation angle of the shaft 2, the rotation angular velocity of the shaft 2, and the change rate of the rotation angular velocity of the shaft 2. The above-described information used to set the threshold is derived from the result of the detection by the detector 5.

For the correlation between the magnitude of the first reaction force and the rotation angle of the shaft 2, a similar correlation may be derived by comparing the correlation between the first reaction forces and the rotation angles which are accumulated in advance under various conditions to an actual value. By this means, it is possible to predict that the first reaction force starts to decrease when the magnitude of the first reaction force reaches a predetermined value or the shaft 2 is rotated for a predetermined rotation angle. In addition, for the rotation angular velocity of the shaft 2, and the change rate of the rotation angular velocity of the shaft 2, a similar rotation angular velocity or the pattern of the change rate may be derived by previously measuring the first reaction force for each of various rotation angular velocities and change rates of the rotation angular velocities, and comparing the previously measured value to an actually measured value. By this means, it is possible to predict that the first reaction force starts to decrease when the shaft 2 is rotated at a predetermined rotation angular velocity or at the change rate of the predetermined rotation angular velocity. With these predictions, it is possible to set, as the threshold, the magnitude of any first reaction force, any rotation angle of the shaft 2, any rotation angular velocity of the shaft 2, and the change rate of any rotation angular velocity when the first reaction force starts to decrease or is decreasing. Here, with the present example illustrated in FIG. 4, the threshold is set for the first reaction force.

The step S2 of detecting the first reaction force by the detector 5 is the same as that in the process illustrated in FIG. 3.

Next, the controller 6 determines whether the first reaction force detected and outputted to the controller 6 is smaller than the threshold (step S6). In the step S6, the controller 6 determines the magnitude relationship by comparing the threshold of the first reaction force set in the previous step S5 to the actually measured first reaction force.

When determining that the first reaction force is not smaller than the threshold, that is, the first reaction force has not been decreased (step S6/NO), the controller 6 performs the previous step S2 of detecting the first reaction force again.

On the other hand, when determining that there is a decrease in the first reaction force because the first reaction force is smaller than the threshold (step 6/YES), the controller 6 activates the second reaction force member 4 (step S4) in the same way as in the process illustrated in FIG. 3. By this means, it is possible to apply the second reaction force to the shaft 2 from the motor rotating in the direction opposite to the rotating direction of the shaft 2.

Then, the controller 6 determines whether the steering reaction force is equal to or greater than the threshold set in the previous step S5 (step S7). In the step S7, the sum of the first reaction force of the first reaction force member 3 and the second reaction force of the second reaction force member 4 is used as the steering reaction force to be compared to the threshold.

When determining that the sum of the first reaction force and the second reaction force is smaller than the threshold, that is, the steering reaction force is still decreasing even though the second reaction force member 4 is activated to apply the second reaction force to the shaft 2 (step S7/NO), the controller 6 outputs a driving signal to the second reaction force member 4 to increase the second reaction force by, for example, increasing the number of rotations of the motor of the second reaction force member 4 (step S42). After this step S42 of increasing the second reaction force, the controller 6 performs the previous step S7 of determining whether the steering reaction force is equal to or greater than the threshold again.

When determining that the problem with the decrease in the first reaction force has been solved because the sum of the first reaction force and the second reaction force is equal to or greater than the threshold (step S7/YES), the controller 6 outputs a driving signal to maintain the second reaction force of the second reaction force member 4 to the second reaction force member 4 (step S41). The process illustrated in FIG. 4 according to the present example ends.

With this process illustrated in FIG. 4, even though there is a decrease in the first reaction force, the second reaction force is applied to the shaft 2, and therefore the steering reaction force that the passenger senses, that is, the sum of the decreased first reaction force and the added second reaction force is not significantly decreased.

With the present invention, it is possible to determine whether there is a decrease in the first reaction force based on not only the information on the first reaction force as the process illustrated in FIG. 3, but also various information on such as the rotation angle of the shaft 2, and the rotation angular velocity of the shaft 2, as well as the first reaction force. That is, it is preferred to set the threshold to have more effective choices to determine whether there is a decrease in the first reaction force. In addition, it is possible to check if there is a decrease in the steering reaction force by comparing the steering reaction force which is the sum of the first reaction force and the second reaction force to the threshold again after starting to apply the second reaction force. Therefore, it is possible to reliably prevent the effect of the decrease in the first reaction force. The threshold is set as a value for which the first reaction force has been decreased, and therefore there is no need to continue to measure the actual first reaction force.

Accordingly, the passenger does not sense or is unlikely to sense that the steering effort becomes light and the rotation is lost in the steering direction, and consequently it is possible to continue to give the passenger an appropriate sense of steering not only when the steering reaction force is developed but also after the development.

With the example illustrated in FIG. 4, the threshold is set for the first reaction force. However, this is by no means limiting. As the threshold for the steering apparatus 1 according to the present invention, it is possible to adopt the threshold of at least one of the rotation angle of the shaft 2, the rotation angular velocity of the shaft 2, and the change rate of the rotation angular velocity. In this case, the target to be detected in the step S2 of detecting the first reaction force illustrated in FIG. 4 is changed depending on what parameter is set as the threshold in the step S5. In the same way, the targets to be determined in the step S6 and the step S7 are changed depending on what parameter is set as the threshold in the step S5.

With the present invention, even in a case in which the threshold is set not for the first reaction force, but for, for example, the rotation angle of the shaft 2, and the rotation angle is smaller than the threshold, it means that the first reaction force starts to decrease, and therefore it is regarded as the same as when the first reaction force is smaller than the threshold. In other words, it is determined whether there is a decrease in the first reaction force in any case, and therefore even though any parameter is used as the threshold, it is regarded as the same as when the threshold of the first reaction force is compared to an actually measured first reaction force.

Here, in a case in which the threshold is not set for the first reaction force, the rotation angle of the shaft 2 when the first reaction force starts to decrease or is decreasing may be set as the threshold. By this means, even though the threshold is not set for the first reaction force, it is possible to apply and stop applying the second reaction force when the first reaction force starts to decrease, in the same way as the control of the second reaction force member 4 based on the actually measured first reaction force illustrated in FIG. 3.

Figure 5:
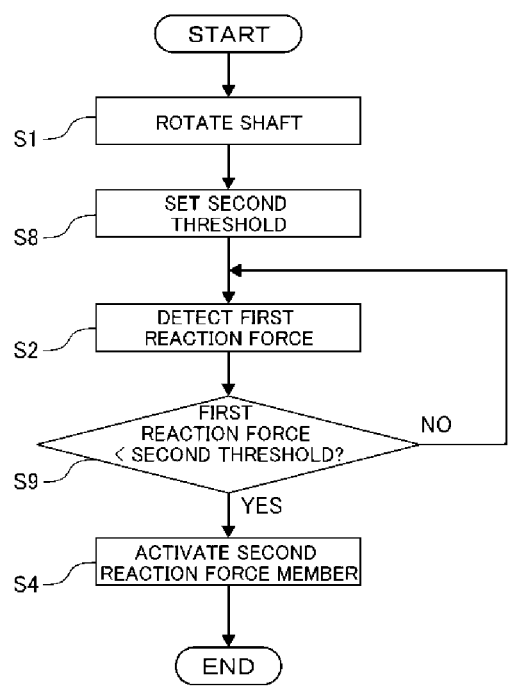
FIG. 5 is a flowchart illustrating a process of applying a steering reaction force to the shaft based on a second threshold by using the steering apparatus illustrated in FIG. 1.

FIG. 5 is a flowchart illustrating a process of applying the steering reaction force to the shaft 2 based on a second threshold by using the steering apparatus 1 illustrated in FIG. 1.

As illustrated in FIG. 5, the step of rotating the shaft 2 with the steering by the passenger (step S1) is the same of that in the process illustrated in FIG. 3. While the shaft 2 is being rotated, that is, the first reaction force member 3 applies the first reaction force to the shaft 2, a second threshold is set (step S8). This second threshold is set based on a parameter that causes the first reaction force to decrease in the future. To be more specific, the second threshold is set based on at least one of the magnitude of the first reaction force, the rotation angle of the shaft 2, the rotation angular velocity of the shaft 2, and the rate of change in each of the magnitude of the first reaction force, the rotation angle, and the rotation angular velocity. The above-described information used to set the second threshold is derived from the result of the detection by the detector 5.

The first reaction force is previously measured and accumulated for each of various rotation angles of the shaft 2, rotation angular velocities of the shaft 2, and change rates of them, and used for setting the second threshold. By this means, it is possible to predict a change in the first reaction force in the future. Here, the first threshold is set for a parameter such as the first reaction force which starts to decease or is decreasing, and the second threshold is different from the first threshold in that the second threshold is set for a parameter based on the first reaction force just before being decreased because the first threshold may cause the steering reaction force to be decreased due to the decrease in the first reaction force. With the present example illustrated in FIG. 5, the second threshold is set for the first reaction force.

The step S2 of detecting the first reaction force detected by the detector 5 is the same as in the process illustrated in FIG. 3.

Next, the controller 6 determines whether the first reaction force detected and outputted by the controller 6 is smaller than the second threshold (step S9). In the step S9, the controller 6 determines the magnitude relationship by comparing the second threshold of the first reaction force set in the previous step (step S8) to the actually measured first reaction force.

When determining that the first reaction force is not smaller than the second threshold, that is, the first reaction force will not decrease in the feature (step S9/NO), the controller 6 performs the previous step S2 of detecting the first reaction force again.

When determining that the first reaction force will decrease in the future because the first reaction force is smaller than the second threshold (step S9/YES), the controller 6 operates the second reaction force member 4 in the same way as in the process illustrated in FIG. 3. By this means, it is possible to apply the second reaction force to the shaft 2 from the motor rotating in the direction opposite to the rotating direction of the shaft 2. The process illustrated in FIG. 5 ends.

Here, the steering reaction force to be applied to the shaft 2 before the first reaction force starts to decrease, that is, a necessary second reaction force of the second reaction force member 4 varies depending on a predicted variation characteristic of the first reaction force. The necessary second reaction force is derived based on the predicted variation characteristic of the first reaction force, and the controller 6 can adjust the second reaction force of the second reaction force member 4.

With this process illustrated in FIG. 5, the second reaction force is applied to the shaft 2 when a parameter by which it is possible to predict that the first reaction force may decrease is detected. By this means, the steering reaction force that the passenger senses, that is, the sum of the decreased first reaction force and the added second reaction force is not significantly decreased. By using the second threshold, the controller 6 can determine whether it is necessary to apply the second reaction force before the first reaction force starts to decrease, and therefore it is possible to reliably prevent the passenger from having a feeling of strangeness when the first reaction force starts to decrease. The second threshold is set as a value for which the first reaction force will be decreased in the future, and therefore there is no need to actually detect the first reaction force decreasing.

Here, with the present invention, it is possible to determine whether the first reaction force will be decreased in the future, based on not only the information on the first reaction force as the process illustrated in FIG. 5, but also various information, such as the rotation angle and the rotation angular velocity of the shaft 2, as well as the first reaction force. With the present invention, even in a case in which the second threshold is set not for the first reaction force, but for, for example, the rotation angle of the shaft 2, and the rotation angle is smaller than the second threshold, it means that the first reaction force will decrease in the feature if the rotation angle and the change rate of the rotation angle are maintained, and therefore it is regarded as the same as when the first reaction force is smaller than the second threshold. In other words, it is determined whether the first reaction force will decrease in the future in any case, and therefore even though any parameter is used as the second threshold, it is regarded as the same as when the second threshold of the first reaction force is compared to an actually measured first reaction force.

Here, in a case in which the second threshold is not set for the first reaction force, the rotation angle of the shaft 2 when the first reaction force starts to decrease or is decreasing may be set as the threshold. By this means, even though the threshold is not set for the first reaction force, it is possible to apply and stop applying the second reaction force when the first reaction force starts to decrease, in the same way as the control of the second reaction force member 4 based on the actually measured first reaction force illustrated in FIG. 3.

Accordingly, the passenger does not sense or is unlikely to sense that the steering effort becomes light and the rotation is lost in the steering direction, and consequently it is possible to continue to give the passenger an appropriate sense of steering not only when the steering reaction force is developed but also after the development.

With the example illustrated in FIG. 5, the second threshold is set for the first reaction force. However, this is by no means limiting. As the second threshold for the steering apparatus 1 according to the present invention, it is possible to adopt the threshold of at least one of the rotation angle of the shaft 2, the rotation angular velocity of the shaft 2, and the change rate of the rotation angular velocity. In this case, the target to be detected in the step S2 of detecting the first reaction force illustrated in FIG. 5 may be changed depending on what parameter is set as the second threshold in the step S8. In the same way, the target to be determined in the step S9 is changed depending on what parameter is set as the second threshold in the step S8.

Here, the step S7 of determining whether the steering reaction force is equal to or greater than the threshold, and the steps 41 and 42 of adjusting the second reaction force as illustrated in FIG. 4 may be added to the process illustrated in FIG. 5. By this means, it is possible to check if the steering reaction force has been decreased by comparing the steering reaction force which is the sum of the first reaction force and the second reaction force to the second threshold again after starting to apply the second reaction force. Therefore, it is possible to reliably prevent the effect of the decrease in the first reaction force.

In the process illustrated in FIG. 5, the controller 6 determines whether the first reaction force is smaller than the second threshold (step S9). In this case, the second threshold is set as the limit at which the first reaction force is not decreased, and before the first reaction force exceeds the second threshold, that is, the first reaction force is smaller than the second threshold as the step S9, the second reaction force member 4 starts to apply the second reaction force. By this means, it is possible to reliably apply the second reaction force to the shaft 2 before the first reaction force starts to decrease, and therefore to effectively prevent the passenger from having a feeling of strangeness caused by the decrease in the first reaction force.

Here, in the process illustrated in FIG. 5, it is determined whether the first reaction force is smaller than the second threshold, and in addition to this, the range of the values of the first reaction force may be set. To be more specific, when the detected first reaction force is smaller than the second threshold and falls within any range from the second threshold, the second reaction force may be applied.

Moreover, instead of the determination in the process illustrated in FIG. 5, it may be determined whether the first reaction force is greater than the second threshold. In this case, if the second reaction force starts to be applied at the time the first reaction force exceeds the second threshold, it is possible to apply the second reaction force when the first reaction force may be ready to decrease but does not start to decrease. In the same way as in the process illustrated in FIG. 5, it is possible to prevent the passenger from having a feeling of strangeness caused by the decrease in the steering reaction force.

In the process illustrated in FIG. 5, the first threshold in the process illustrated in FIG. 4 may be set. If both the first threshold and the second threshold are set, it is preferred that they are selectively used. To be more specific, first, the step S9 of determining whether the first reaction force is smaller than the second threshold is performed as illustrated in FIG. 5, and then the step S4 of activating the second reaction force member 4 is performed. Next, the step S7 of determining whether the steering reaction force that is the sum of the first reaction force and the second reaction force is equal to or greater than the first threshold is performed. By this means, it is possible to check if the second reaction force is effective.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A steering apparatus for use in a vehicle equipped with a steer-by-wire system, the apparatus comprising:
   a shaft rotatable with rotation of a steering wheel disposed in a vehicle compartment;
   a first reaction force member configured to apply a first reaction force in a direction opposite to a direction of the rotation of the shaft; and
   a second reaction force member configured to capable of applying and stopping applying a second reaction force to the shaft, the second reaction force being different from the first reaction force and being applied in a direction opposite to the direction of the rotation of the shaft,
   wherein the second reaction force member applies the second reaction force when there is a decrease in the first reaction force,
   wherein the first reaction force member comprises an elastic member disposed around the shaft, the elastic member being configured to contact the shaft rotating to apply the first reaction force to the shaft.

2. The steering apparatus according to claim 1, wherein the second reaction force member applies the second reaction force when the first reaction force is smaller than a predetermined threshold, the predetermined threshold being on a basis of at least one of a correlation between a magnitude of the first reaction force and a rotation angle of the shaft, a rotation angular velocity of the shaft, or a change rate of the rotation angular velocity of the shaft.

3. The steering apparatus according to claim 1, wherein the second reaction force member applies the second reaction force when the first reaction force is smaller than a predetermined threshold, the predetermined threshold being on a basis of at least one of a correlation between a magnitude of the first reaction force and a rotation angle of the shaft, a rotation angular velocity of the shaft, or a change rate of the rotation angular velocity of the shaft.

4. The steering apparatus according to claim 1, wherein the second reaction force member applies the second reaction force when the first reaction force is greater than a predetermined second threshold, the predetermined second threshold being set on a basis of at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

5. The steering apparatus according to claim 1, wherein the second reaction force member applies the second reaction force when the first reaction force is greater than a predetermined second threshold, the predetermined second threshold being set on a basis of at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

6. The steering apparatus according to claim 2, wherein the second reaction force member applies the second reaction force when the first reaction force is greater than a predetermined second threshold, the predetermined second threshold being set on a basis of at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

7. The steering apparatus according to claim 3, wherein the second reaction force member applies the second reaction force when the first reaction force is greater than a predetermined second threshold, the predetermined second threshold being set on a basis of at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

8. The steering apparatus according to claim 1, wherein the second reaction force member applies the second reaction force when the first reaction force is smaller than a predetermined second threshold, the predetermined second threshold being set based on at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

9. The steering apparatus according to claim 1, wherein the second reaction force member applies the second reaction force when the first reaction force is smaller than a predetermined second threshold, the predetermined second threshold being set based on at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

10. The steering apparatus according to claim 2, wherein the second reaction force member applies the second reaction force when the first reaction force is smaller than a predetermined second threshold, the predetermined second threshold being set based on at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

11. The steering apparatus according to claim 3, wherein the second reaction force member applies the second reaction force when the first reaction force is smaller than a predetermined second threshold, the predetermined second threshold being set based on at least one of a magnitude of the first reaction force, a rotation angle of the shaft, a rotation angular velocity of the shaft, or a rate of change in each of the magnitude of the first reaction force, the rotation angle and the rotation angular velocity which cause a decrease in the first reaction force.

\* \* \* \* \*